United States Patent

[11] 3,536,039

| [72] | Inventor | Arthur N. Gardiner |
| | | Somerville, New Jersey |
| [21] | Appl. No. | 741,437 |
| [22] | Filed | July 1, 1968 |
| [45] | Patented | Oct. 27, 1970 |
| [73] | Assignee | RCA Corporation |
| | | a corporation of Delaware |

[54] MARKING DEVICE
4 Claims, 3 Drawing Figs.

[52] U.S. Cl. ........................................ 118/243, 346/140
[51] Int. Cl. ........................................ B05c 1/02
[50] Field of Search........................................ 401/258, 198; 15/(Ferrules Dig); 346/140; 127/(Inquired); 118/243, 3, 256

[56] References Cited
UNITED STATES PATENTS
2,643,801  6/1953  Kollmeyer..................... 401/258X

| 3,329,964 | 7/1967 | Mutschler et al. | 346/140X |
| 3,334,354 | 8/1967 | Mutschler | 346/140 |
| 3,397,939 | 8/1968 | Berry | 401/198 |

*Primary Examiner*—John P. McIntosh
*Attorney*—G.H. Bruestle

ABSTRACT: In the fabrication of semiconductor devices, the semiconductor components, while still part of a common wafer, are tested by a probing machine and marked by a marking device for segregation of the components after the wafer is cracked. An improved marking device is provided comprising an elongated nylon nib slidably disposed through an elongated guide tube. Means are provided for advancing the nib outwardly of the guide tube and retracting the leading end of the nib within the tube. Marking fluid is introduced into the guide tube, whereby the leading end of the nib is wet each time the nib is retracted.

Patented Oct. 27, 1970  3,536,039

INVENTOR
ARTHUR N. GARDINER

BY M. Y. Epstein
ATTORNEY

MARKING DEVICE

BACKGROUND OF THE INVENTION

This invention relates to the fabrication of semiconductor devices, and particularly to the testing and marking of such devices.

In the manufacture of semiconductor devices, e.g., integrated circuits, it is a practice to provide, by photolithographic and diffusion processes, rows and columns of spaced and discrete semiconductor device components on a single wafer. The wafer is thereafter diced to provide individual semiconductor component pellets which are then assembled within semiconductor device envelopes.

Prior to the dicing operation, it is the practice to test each of the semiconductor components for operability using a "probing" machine. Such machines comprise a plurality of radially inwardly extending probes for making electrical contact with surface portions of the individual components, and an inker for placing a visible ink mark on various ones of the components indicative of the results of the electrical testing.

One problem associated with the use of such probing machines is the difficulty of providing a suitable inker which is fast operating while not being destructive of the components being marked. Prior art inkers comprise a metal, ink-containing capillary tube which is indexed into contact with the surface of a tested component. Although it is attempted to provide a gentle contacting of the inker tube with the components, it frequently occurs that the inker tube gouges into the component surface, thereby damaging the component. Thus, the use of such inkers is generally restricted to marking components which have tested as electrically inoperable.

Situations occur, however, wherein for any number of reasons, e.g., a change in test criteria, a discovery of an error in the testing circuit, or the like, components which tested as inoperable on one occasion, test as being satisfactory upon a subsequent testing. Components damaged by the inker, however, are not readily repairable and thus cannot be retested.

Additionally, a frequent practice in the fabrication of semiconductor devices is to grade the components, on the basis of the results of electrical testing, into different classes or types. It would thus be desirable, in certain instances, to use two or more inkers to mark the various components with different colored ink for the purpose of grading the various components. Such practice, of course, requires that the inkers be nondamaging of the components.

SUMMARY OF THE INVENTION

A marking device is provided comprising an elongated guide tube, and an elongated marking bristle, or nib, slidably disposed through the guide tube. The nib is made of a relatively soft and flexible material, such as nylon. Means are provided for advancing the leading end of the nib out of the guide tube and into contact with a device to be marked, and for retracting the leading end of the nib into the tube. Means are provided for introducing marking fluid into the guide tube for wetting the nib end.

DESCRIPTION OF PREFERRED EMBODIMENTS OF THE INVENTION

Figure 1:
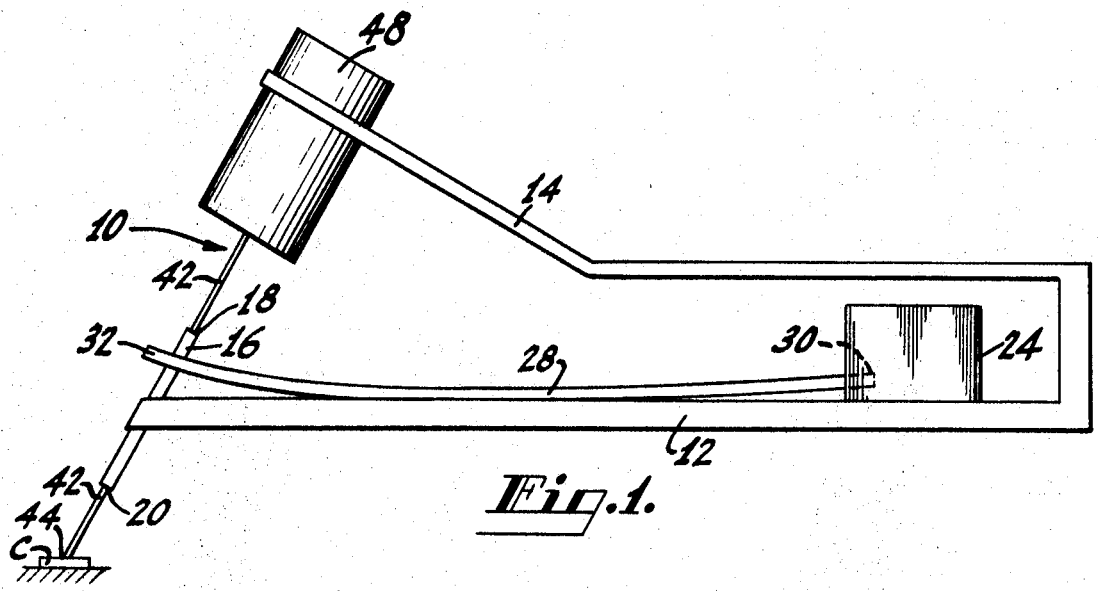
FIG. 1 is a side elevation of a marking device of the present invention.

With reference to FIG. 1, a marking device 10 comprises a support plate 12 including an extending bracket 14. Secured to the plate 12 is an elongated guide tube 16 having open ends 18 and 20. In one embodiment, the guide tube 16 is a metal hypodermic needle having an inside diameter of 0.012 inch.

The lower end 20 of the tube 16 is disposed in preselected relation with a component C being tested on a probing machine of a type with which marking devices of the present invention have utility. A description of such a probing machine is not given, since such machines are known. Also, the mounting of marking devices of the present invention on such probing machines is not described since suitable mounting means will be obvious to persons skilled in the art.

A source or reservoir 24 of marking fluid, e.g., commercially available, slow-drying graphic ink, is mounted on the support plate 12.

Extending between the reservoir 24 and the guide tube 16 is a capillary tubing 28, having, in the present embodiment, an inside diameter of 0.035 inch. One open end 30 of the tubing 28 extends into the reservoir 24 below the level of the fluid therein, and the other end 32 of the tubing 28 communicates with the interior of the tube 16, as follows.

Figure 2:
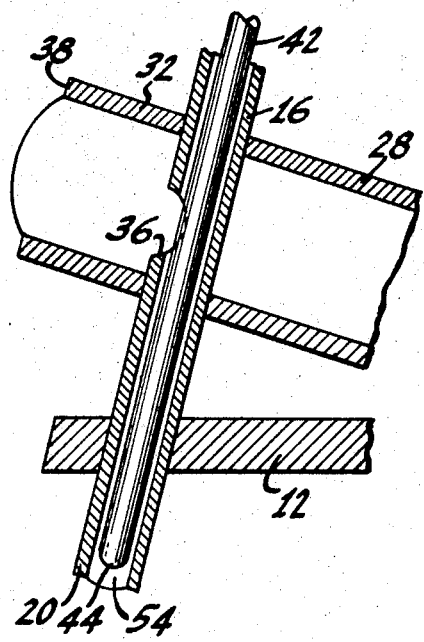
FIG. 2 is a vertical section, on an enlarged scale, taken through a portion of the device shown in FIG. 1.

As shown in FIG. 2, the tube 16 has an opening 36 in the wall thereof, the tube opening 36 being disposed within the tubing 38. In assembly of the marking device 10, the tube 16 is inserted transversely through the tubing 28 which, preferably, is of a plasticlike material. The leading end 38 of the tubing is open to the atmosphere, for a reason described hereinafter.

The inside diameter of both the capillary tubing 28 and the tube 16 are sufficiently small that these members serve as capillaries for the marking fluid. Thus, the marking fluid flows from the reservoir 24 through the tubing 28 and into and along the tube 16 by capillary pressure. Also, because of the small inside diameters of tubing 28 and the tube 16, the surface tension of the fluid is sufficient to prevent the fluid from dripping out of the open ends of the tubing and the tube.

Slidably disposed through the guide tube 16 is an elongated marking bristle or nib 42 having, in the present embodiment, a diameter of 0.011 inch. The nib 42 is made of a relatively soft and flexible material, such as plastic. A preferred material is nylon.

The nib 42 has a leading end 44, and a rear end (not visible in FIG. 1) connected to the plunger of a solenoid 48 mounted on the bracket 14. The solenoid 48 is operable to advance the leading end 44 of the nib 42 outwardly of the guide tube 16 and into contact with a component C being tested, and to retract the nib end 44 within the guide tube 16, as shown in FIG. 2.

Between marking operations, i.e., while the nib 42 is in its retracted position, the marking fluid flows downwardly past the nib end 44 to the end 20 of the tube 16 where it forms a meniscus 54. The amount of fluid in front of the nib end 44, and thus the amount of ink carried forward by the nib, is determined by the distance of the nib end 44 from the end 20 of the tube when the nib is fully retracted.

In repeated operation of the device, small amounts of air are carried into the tube 16 with the nib 42. The air forms bubbles in the fluid which could block the flow of the fluid. The open end 38 of the capillary tubing 28 allows the air bubbles to escape.

Figure 3:
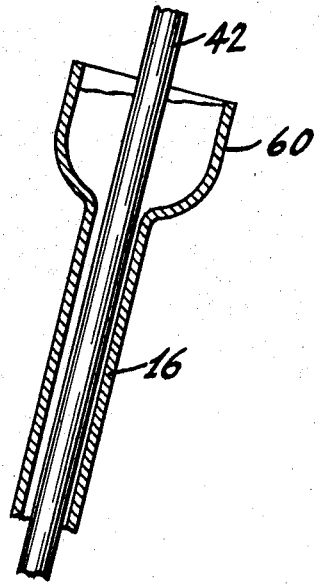
FIG. 3 is a vertical section showing a modification of the device shown in FIG. 1.

In FIG. 3 is shown a portion of a marking device wherein the guide tube 16 is provided with an enlarged cup-shaped upper portion 60. The portion 60 serves as the reservoir of marking fluid, and the capillary tubing 28 of the device shown in FIGS. 1 and 2 is not used.

Charging the guide tube 16 with marking fluid, as described, results in the nib 42 transferring a preselected amount of ink to the device being marked, and serves as an efficient and fast acting means for rewetting the nib. Thus, the device is capable of being extremely fast acting. Further, the soft and flexible nib does not damage the devices being marked.

I claim:
1. A marking device comprising:
   a guide tube;
   a nib slidably disposed through said tube, said nib having a leading end;
   means for advancing the leading end of said nib outwardly of said tube and for retracting said leading end within said tube; and a capillary tubing extending transversely of said tube, and a reservoir of marking fluid, one end of the said tubing communicating with said reservoir, and the other end of said tubing communicating with the interior of said guide tube, said tube and said nib being dimensioned to provide a capillary spacing therebetween.

2. A marking device as in claim 1 wherein said tubing communicates with the interior of said guide tube through an opening through a portion of the wall of said guide tube intermediate the ends thereof.

3. A marking device as in claim 2 wherein:
said guide tube extends transversely through said tubing intermediate the ends of said tubing; and
said wall portion of said guide tube is disposed interiorly of said tubing.

4. A marking device as in claim 3 wherein said other end of said tubing is open.